US009963019B2

(12) United States Patent
Ngo

(10) Patent No.: US 9,963,019 B2
(45) Date of Patent: May 8, 2018

(54) SUN VISOR HAVING EXTENDED RANGE OF MOTION

(71) Applicant: FORD GLOBAL TECHNOLOGIES, LLC, Dearborn, MI (US)

(72) Inventor: Tom Thanh Ngo, Troy, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 44 days.

(21) Appl. No.: 15/152,289

(22) Filed: May 11, 2016

(65) Prior Publication Data

US 2017/0326953 A1    Nov. 16, 2017

(51) Int. Cl.
*B60J 3/02*    (2006.01)

(52) U.S. Cl.
CPC .................................. B60J 3/0239 (2013.01)

(58) Field of Classification Search
CPC ............................. B60J 3/0239; B60J 3/0265
USPC ...................................................... 296/97.11
See application file for complete search history.

(56) References Cited

U.S. PATENT DOCUMENTS

| | | | |
|---|---|---|---|
| 3,865,428 A | 2/1975 | Chester | |
| 4,925,233 A | 5/1990 | Clark | |
| 5,951,089 A * | 9/1999 | Delus | B60J 3/0234 296/97.11 |
| 6,170,899 B1 * | 1/2001 | Corn | B60J 3/0208 296/97.11 |
| 6,174,019 B1 | 1/2001 | Collet et al. | |
| 6,286,887 B1 * | 9/2001 | Hashmi | B60J 3/0234 248/292.14 |
| 7,144,062 B2 | 12/2006 | Asai | |
| 7,347,480 B2 * | 3/2008 | Lee | B60J 3/0204 296/97.11 |
| 8,333,422 B2 * | 12/2012 | Ogawa | B60J 3/0265 296/97.11 |
| 8,845,000 B2 * | 9/2014 | Asai | B60J 3/0265 296/97.11 |
| 9,302,568 B2 * | 4/2016 | Kim | B60J 3/04 |
| 2005/0040667 A1 * | 2/2005 | Schneider | B60J 3/0204 296/97.12 |

FOREIGN PATENT DOCUMENTS

| | | | | |
|---|---|---|---|---|
| CN | 203920355U U | | 11/2014 | |
| GB | 2053114 A | * | 2/1981 | ............ B60J 3/0208 |
| JP | 63315321 A | | 12/1988 | |
| WO | WO 2004071796 A1 | * | 8/2004 | ............ B60J 3/0239 |

OTHER PUBLICATIONS

English Machine Translation of CN203920355U.
English Machine Translation of JP63315321A.

* cited by examiner

*Primary Examiner* — Pinel E Romain
(74) *Attorney, Agent, or Firm* — Vichit Chea; King & Schickli PLLC

(57) ABSTRACT

An extended-range sun visor assembly includes a rail and a sun visor panel. The sun visor panel is releasably mounted to the rail at an inboard sun visor panel end and slidably mounted to the rail at an outboard sun visor panel end. The rail may be fixed at opposite ends thereof to a vehicle roof panel and/or headliner. The sun visor panel is releasably mounted at the inboard end by a snap fit retainer, and slidably mounted at the outboard end by a shaft coupler configured to slide along a longitudinal axis of the rail. The shaft coupler pivots or swivels around a shaft coupler vertical axis.

19 Claims, 4 Drawing Sheets

SUN VISOR HAVING EXTENDED RANGE OF MOTION

TECHNICAL FIELD

This disclosure relates generally to sun visors for motor vehicles. More particularly, the disclosure relates to an improved sun visor assembly configured for both a sliding and a pivoting or swiveling movement relative to a carrying rail, thereby providing an extended range of motion for the sun visor.

BACKGROUND

It has long been known to equip a motor vehicle with sun visors to shade the eyes of the driver and front seat passenger from the glare of the sun coming through the windshield or window of a motor vehicle. Many motor vehicles include sun visors that are pivotally mounted on individual stalks and manually pivoted on the stalks between a stowed position adjacent the motor vehicle headliner and one or more operating positions covering an upper portion of the windshield or side window. Unfortunately, such sun visors have a limited range of motion and so provide glare protection over only a limited range of visor positions. For example, most sun visor designs provide little or no protection against glare coming through the windshield at or near a centrally mounted rear view mirror.

It is also known to provide extendable sun visors for vehicles, with the intended purpose of allowing greater flexibility for the user in positioning the sun visor to prevent or reduce glare. Prior art designs often are simply a visor panel or blade which the user can manually extend outwardly along a swiveling support arm, or from within a main visor body panel, to translate the panel from a first position to a second, extended position.

While effective for their intended purposes, the above-described prior art sun visors suffer from various deficiencies. Specifically, most sun visor designs focus on reducing glare passing through the side windows and the upper windshield portion directly in front of a vehicle occupant, but neglect to consider glare passing through relatively unblocked portions of the vehicle windshield such as the area surrounding the centrally-mounted rear view mirror. In turn, prior art extendable sun visor designs tend to require relatively complex mechanisms to provide desired functionalities, resulting in an increased manufacturing cost that must be passed on to the consumer. Thus, a need is identified in the art for improvements to prior art sun visor designs.

SUMMARY

In accordance with the purposes and benefits described herein and to solve the above-summarized and other problems, in one aspect a vehicle sun visor assembly is described, comprising a rail and a sun visor panel. The sun visor panel is releasably mounted to the rail at an inboard sun visor panel end and slidably mounted to the rail at an outboard sun visor panel end. In embodiments, the the rail is fixed to a vehicle roof panel and/or headliner. In embodiments, the rail is mounted at opposed ends thereof to the vehicle roof panel and/or headliner.

In embodiments, the sun visor panel is releasably mounted at the inboard end by a snap fit retainer and is slidably mounted at the outboard end by a shaft coupler configured to slide along a longitudinal axis of the rail. The shaft coupler may be further configured to pivot or swivel around a shaft coupler vertical axis.

In other aspects, carrier systems for a vehicle sun visor are described including the sun visor assembly substantially as described above.

In the following description, there are shown and described embodiments of an extended-range sun visor assembly. As it should be realized, the assembly is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed extended-range sun visor assembly, and together with the description serve to explain certain principles thereof. In the drawing.

Reference will now be made in detail to embodiments of the disclosed extended-range sun visor assembly, examples of which are illustrated in the accompanying drawing figures wherein like reference numerals indicate like features.

DETAILED DESCRIPTION

Figure 1:
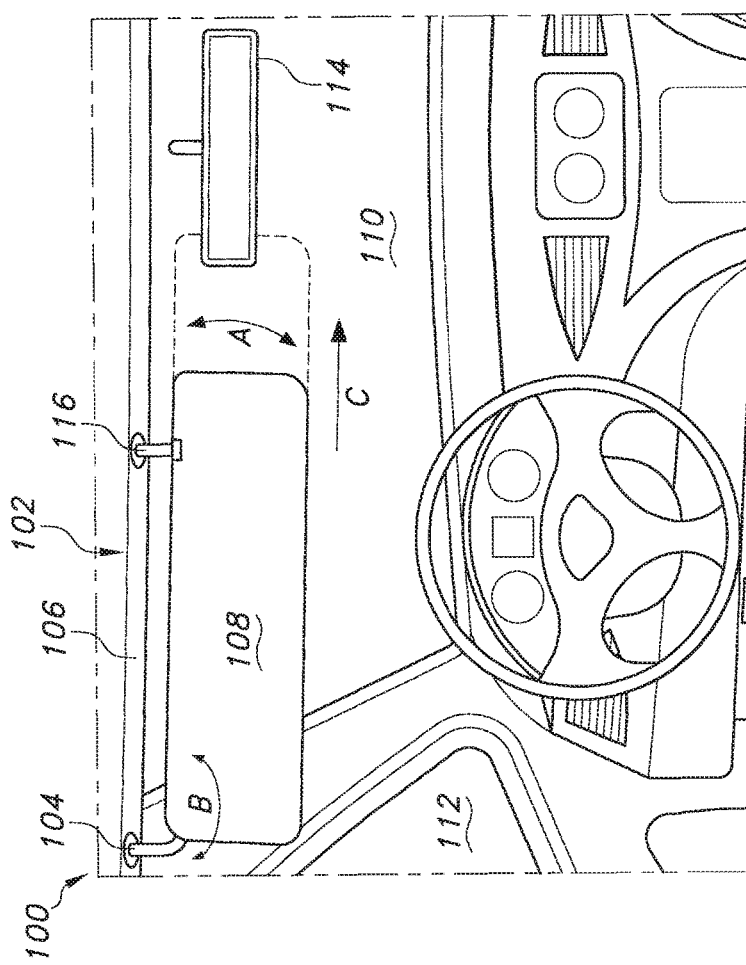
FIG. 1 depicts a vehicle equipped with a prior art sun visor assembly.

FIG. 1 depicts a portion of a vehicle 100 including a representative prior art sun visor assembly 102. As shown therein, the typical such assembly 102 includes a pivoting stalk 104 mounted to a vehicle headliner 106 and/or roof panel (not visible in this view), and a sun visor panel 108. The sun visor panel 108 is configured to pivot around a longitudinal axis of the pivoting stalk 104 (arrow A) to translate the panel between a position substantially parallel to and flush with the headliner 106 and a position substantially parallel to and flush with the vehicle windshield 110. By pivoting the sun visor panel 108 about the stalk 104 to position the sun visor panel adjacent a vehicle side window 112 (arrows B), glare entering the side window may be blocked. If the sun visor panel 108 is extendable, typically the end of the panel opposite the pivoting stalk 104 is the end which is extendable (arrow C), in the depicted embodiment towards the vehicle rear-view mirror 114. A releasable retainer such as a snap-fit retainer 116 is typically provided to hold the sun visor panel 108 in place when not pivoted towards the side window 112.

Figure 2:
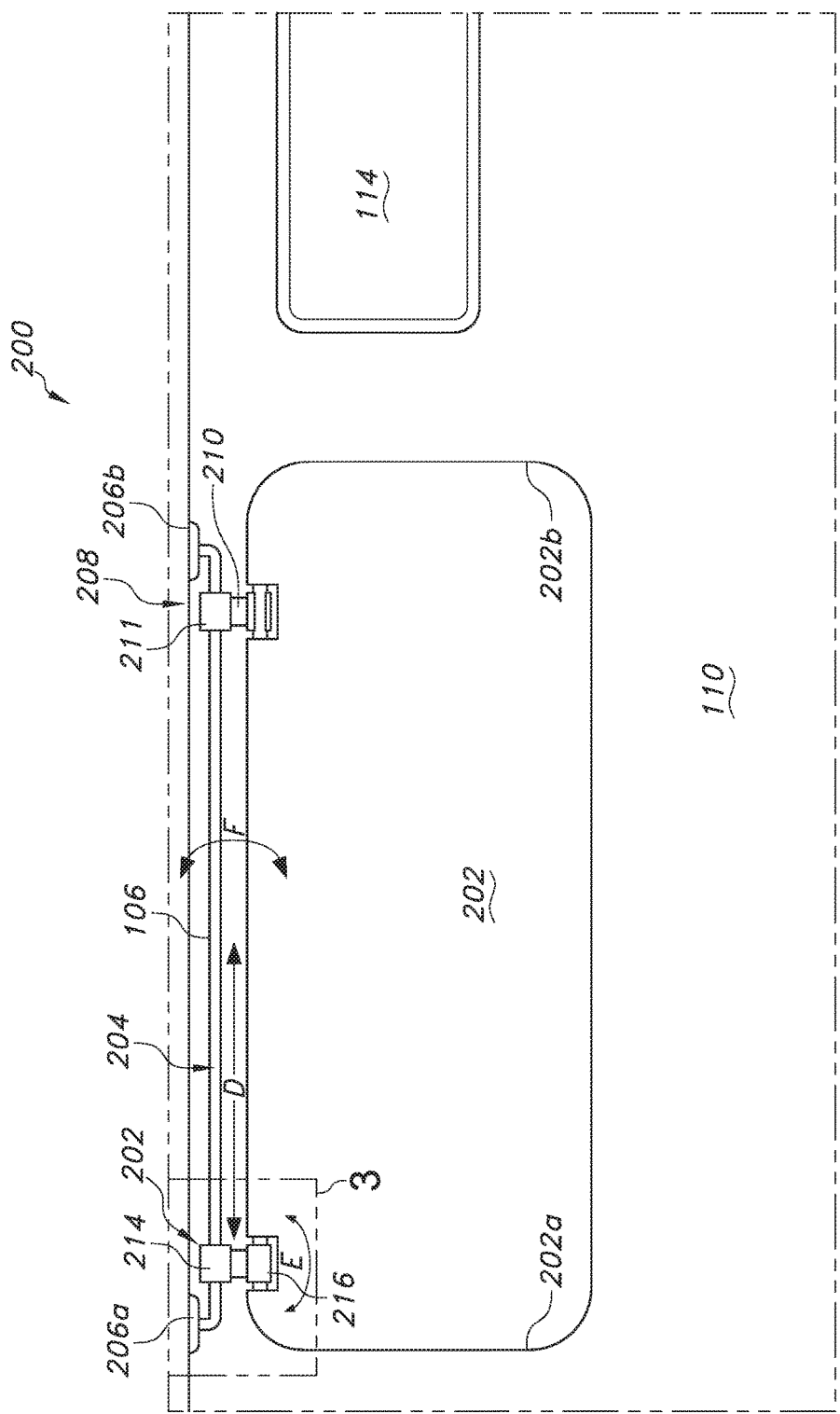
FIG. 2 depicts a vehicle equipped with an extended-range sun visor assembly according to the present disclosure.

With reference to FIG. 2 an extended range sun visor assembly 200 is provided including a sun visor panel 202 disposed adjacent to a rear-view mirror 114. The sun visor panel 202 is mounted to the vehicle headliner 106 and/or roof panel (not visible in this view) by a rail 204. As shown, the rail 204 is fixedly mounted to the headliner 106 at opposed ends 206a, 206b thereof. Specifically, the rail 204 is fixed to the headliner 106 at an outboard (relative to the vehicle) end 206a and at an inboard end 206b which is closest to the rear-view mirror 114.

The inboard end 202b of the sun visor panel is releasably mounted to the rail 204 by a releasable shaft coupler 208, in the depicted embodiment including a snap-fit coupling 210 of substantially known design which captures a portion of the sun visor panel 202 in a friction or interference fit. As depicted, the releasable shaft coupler 208 is attached to the rail 204 by a rotating coupler 211. Thus, to release the inboard end 202b of the sun visor panel, a user need only pull on the inboard end to remove the panel from the snap-fit coupling 210. Such mechanisms are common for sun visor panels.

The outboard end 202a of the sun visor panel is slidably mounted to the rail 204 by a sliding shaft coupler 212. The sliding shaft coupler 212 includes a sliding portion 214 configured to slidingly capture the rail 204 whereby the sliding shaft coupler 212 and the attached sun visor panel 202 can be translated (arrow D) along a longitudinal axis of the rail. The sliding shaft coupler 212 also includes a pivoting portion 216 configured to pivot (arrow E) about a central axis of the sliding shaft coupler whereby the sun visor panel 202 can be translated between the position shown in FIG. 2 and a position substantially parallel to and flush with a vehicle side window (not shown in this view). In turn, by rotating coupler 211 and sliding shaft coupler 212, the sun visor panel 202 may be translated between a position substantially adjacent to and flush with the vehicle windshield 110 and a position substantially adjacent to and flush with the vehicle headliner 106 (arrow F).

Figure 3:
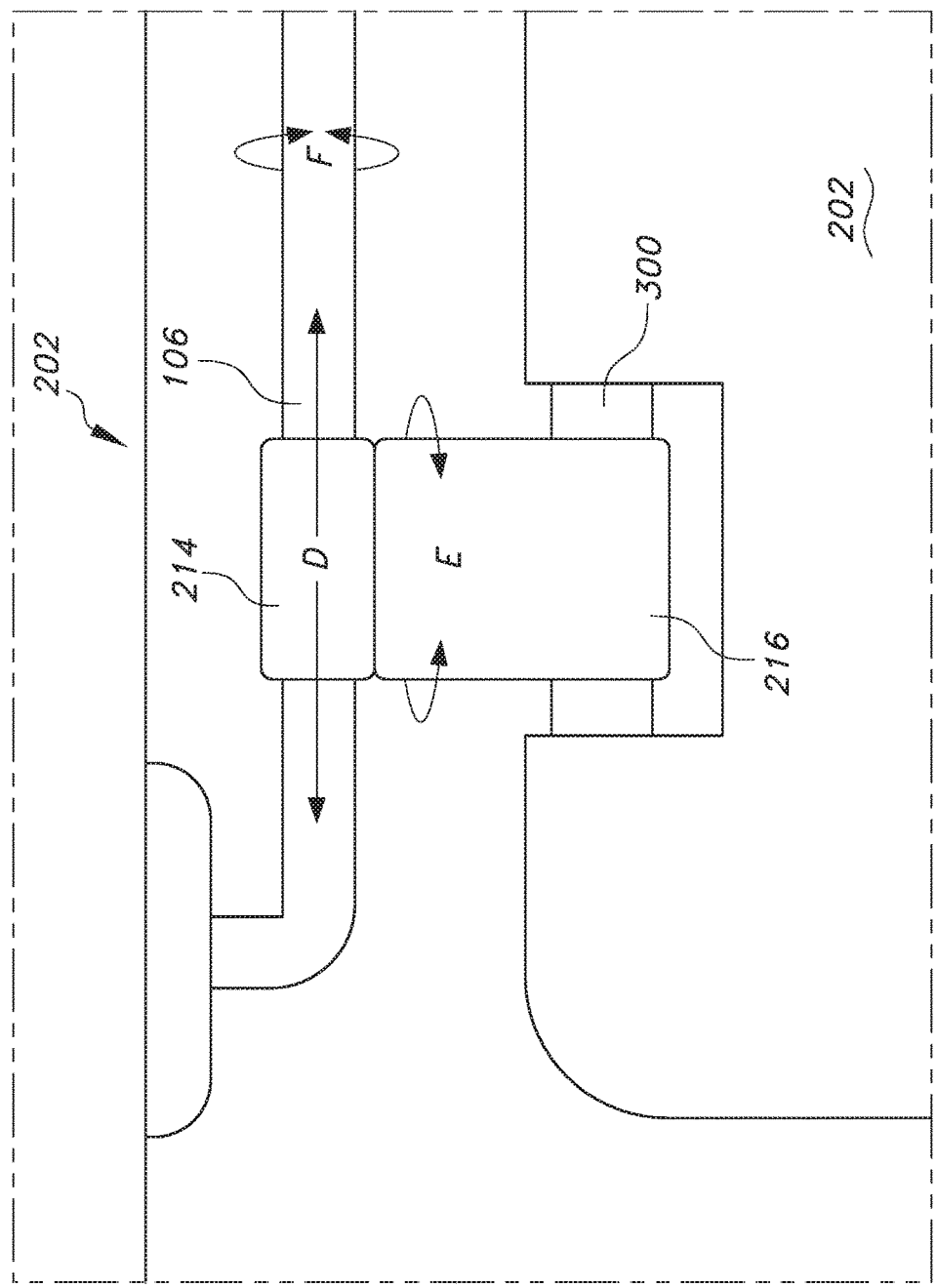
FIG. 3 depicts a sliding shaft coupler for use with the extended-range sun visor assembly of FIG. 2.

The sliding shaft coupler 212 is shown in isolation in FIG. 3. As illustrated, the shaft coupler 212 includes a sliding portion 214 configured to capture the fixed rail 106 in a sufficiently snug friction fit to allow a sliding motion along a longitudinal axis of the rail (arrow D) and also a rotating motion around the longitudinal axis of the rail (arrows F). By this rotating motion the sun visor panel 202 may be rotated from a position substantially flush against the vehicle windshield to a stowed position substantially flush against the vehicle headliner 106 (not shown in this view). In turn, the pivoting portion 216 fixedly captures a portion of the sun visor panel 202 such as a rod or shaft 300. By the pivoting motion provided (arrows E), the sun visor panel 202 may be rotated from a position substantially flush against the vehicle windshield to a position substantially flush against the vehicle side window (not shown in this view).

Figure 4:
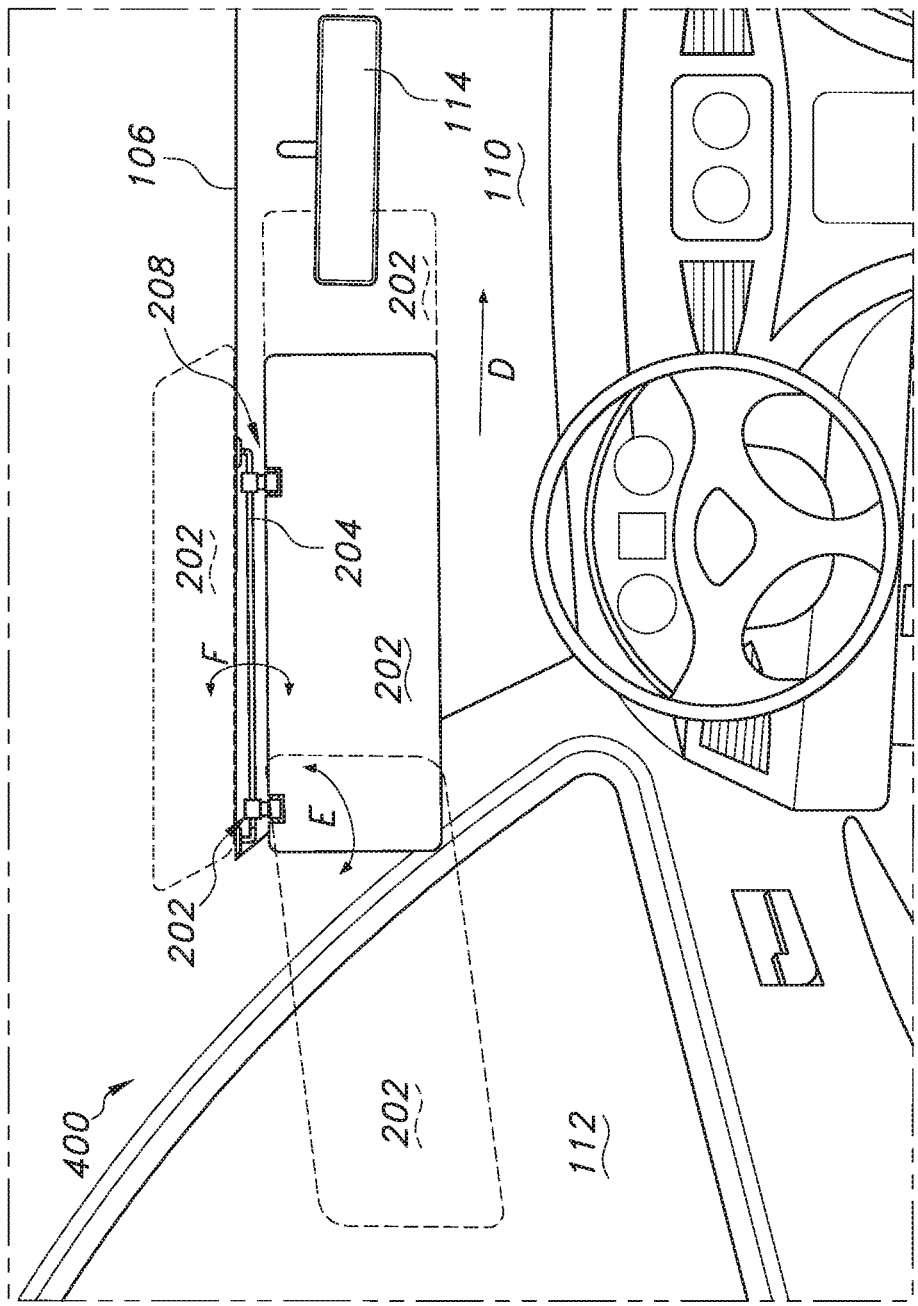
FIG. 4 shows a representative range of motion of the extended-range sun visor assembly of FIG. 2.

The full range of motion of the sun visor assembly 200 is illustrated in FIG. 4, depicting a vehicle 400 including the sun visor assembly as described above. As shown, by the structures described above the sun visor panel 202 may be translated between a position substantially flush with the vehicle windshield 110 to a position substantially flush with the vehicle headliner 106, and from the position substantially flush with the vehicle windshield 110 to a position substantially flush with the vehicle side window 112. In turn, by the sliding shaft coupler 212 the sun visor panel 202 may be slidingly translated alone the rail 204 longitudinal axis towards the vehicle rear-view mirror 114. Thus, glare from the sun may be blocked along a top portion of the windshield 110, including a central portion adjacent to and behind the rear-view mirror 114.

As will be appreciated, by the foregoing described features a simple, robust, and easy-to-operate extended-range sun visor assembly 200 is provided. By the described mechanisms, glare from the sun passing through a wide portion of the vehicle windshield 110 may be blocked, including glare passing through a central portion of the windshield near the rear-view mirror 114 which conventional sun visors typically cannot block. In turn, the assembly 200 allows blocking glare passing through the vehicle side window 112. Although such is not specifically illustrated herein, the skilled artisan will appreciate that a corresponding sun visor assembly 200 may be provided for both a driver's side and a passenger's side of the vehicle 400, thus providing the desirable extended-range sun visor for both sides of the vehicle windshield 110.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle sun visor assembly, comprising:
   a rail; and
   a sun visor panel releasably mounted to the rail at an inboard sun visor panel end and slidably mounted to the rail at an outboard sun visor panel end.

2. The assembly of claim 1, wherein the rail is fixed to a vehicle roof panel and/or headliner.

3. The assembly of claim 2, wherein the fixed rail is mounted at opposed ends thereof to the vehicle roof panel and/or headliner.

4. The assembly of claim 2, wherein the sun visor panel is releasably mounted at the inboard end by a snap fit retainer.

5. The assembly of claim 1, wherein the sun visor panel is slidably mounted at the outboard end by a shaft coupler configured to slide along a longitudinal axis of the rail.

6. The assembly of claim 5, wherein the shaft coupler is further configured to pivot or swivel around a shaft coupler vertical axis.

7. A vehicle including the assembly of claim 1.

8. A carrier system for a vehicle sun visor, comprising:
   a fixed rail;
   a releasable inboard sun visor retainer; and
   a sliding outboard sun visor retainer.

9. The assembly of claim 8, wherein the fixed rail is mounted at opposed ends thereof to a vehicle roof panel and/or headliner.

10. The assembly of claim 8, wherein the releasable inboard sun visor retainer is a snap fit retainer.

11. The assembly of claim 8, wherein the sliding outboard sun visor retainer is a shaft coupler configured to slide along a longitudinal axis of the fixed rail.

12. The assembly of claim 11, wherein the shaft coupler is further configured to pivot or swivel around a shaft coupler vertical axis.

13. A vehicle including the assembly of claim 8.

14. A vehicle sun visor assembly, comprising:
   a fixed rail; and
   a sun visor panel releasably mounted to the rail at an inboard sun visor panel end and slidably mounted to the rail at an outboard sun visor panel end.

15. The assembly of claim 14, wherein the fixed rail is mounted at opposed ends thereof to a vehicle roof panel and/or headliner.

16. The assembly of claim 14, wherein the sun visor panel is releasably mounted at the inboard end by a snap fit retainer.

17. The assembly of claim 14, wherein the sun visor panel is slidably mounted at the outboard end by a shaft coupler configured to slide along a longitudinal axis of the rail.

18. The assembly of claim 17, wherein the shaft coupler is further configured to pivot or swivel around a shaft coupler vertical axis.

19. A vehicle including the assembly of claim 14.

* * * * *